INVENTORS
HERBERT WELZEL
HEINZ BACHMANN
BY Young & Thompson
ATTORNEYS ated Sept. 9, 1969

United States Patent Office 3,465,657
Patented Sept. 9, 1969

3,465,657
FILM TAKE-UP SPOOL DEVICE FOR CAMERAS
Herbert Welzel and Heinz Bachmann, Dresden, Germany, assignors to VEB Pentacon Dresden Kamera- und Kinowerke, Dresden, Germany
Filed Mar. 14, 1966, Ser. No. 534,075
Int. Cl. G03b 19/04
U.S. Cl. 95—31                                    4 Claims

ABSTRACT OF THE DISCLOSURE

The take-up spool of a camera drivable simultaneously with a film transport sprocket is provided with a stirrup which moves in radial slots provided in the take-up spool flanges. A guide member urges the film end towards the spool core and forms a loop around the stirrup as the latter is rotated together with the take-up spool. The tension applied to the take-up film end causes the stirrup to move along the slots until the film end is pressed against the core.

---

The present invention relates to a photographic camera having apparatus for the fastening of the end of the form i.e. the film lead, to the core of the take-up spool.

In almost all the apparatus of this kind which have become known hitherto, on the spool core there are provided engaging teeth which grasp the film coming from the film feed roller on the take-up side, by means of its perforation. The threading devices which work according to this principle have the disadvantage that operational reliability is rendered doubtful if damage to the perforation occurs. Moreover with the individual film manufacturers and kinds of film, the inclination of the film pieces to roll is greatly variable, so that under some circumstances engaging teeth may not come into engagement. Engagement is also rendered doubtful if the film piece has a slight transverse distortion.

The danger of such operating troubles is in fact less with those devices where the film is guided by pivotable guide passages into the vicinity of the spool core, but these guide arrangements require considerable expense.

A threading apparatus has also become known which dispenses with engaging pieces engaging in the perforation and brings about a force-engaged connection between film lead and the following film turns by means of friction blocks resiliently mounted on the spool core, in combination with a guide plate almost completely surrounding the core. Even such an arrangement requires relatively high expense. Furthermore with this arrangement and also the other arrangements which have become known it is a prerequisite that the take-up spool core should rotate in the same direction as the film feed roller.

It is the object of the present invention to provide an arrangement for the automatic fastening of the film lead on the core of the take-up spool in cameras where the film feed roller is mounted on the take-up side, which arrangement is simple in construction and at the same time operationally reliable and usable even with those cameras where the take-up spool core rotates oppositely to the film feed roller.

According to the invention there is provided at least one U-shaped engaging stirrup, which is guided in slots extending radially of the take-up spool core and the legs of which are pivotally mounted laterally of the said slots in the direction of rotation of the take-up spool core, on the two spool flanges, which stirrup takes up the film lead guided between the spool flanges and bearing upon the take-up spool core and, forming a film loop, moves under the action of the film traction to the take-up spool core and in doing so presses the film lead against the take-up spool core.

According to a further feature of the invention the take-up spool core is flattened or has a cut-away portion at the level of the slots. The engaging stirrup together with the film loop surrounding it can fit into the free space thus formed, so that thus a round roll of film is produced.

In order that the invention may be used in cameras where the film feed roller and the take-up spool core rotate in the same direction, according to a further feature of the invention on the camera housing there is arranged a spring-loaded presser piece which can be hinged away and comprises a guide face which presses the film against the film feed roller and guides the film lead on to the side of the take-up spool core nearest to the film feed roller.

The invention will be explained in greater detail hereinafter with reference to the accompanying drawings in which.

Figure 1:
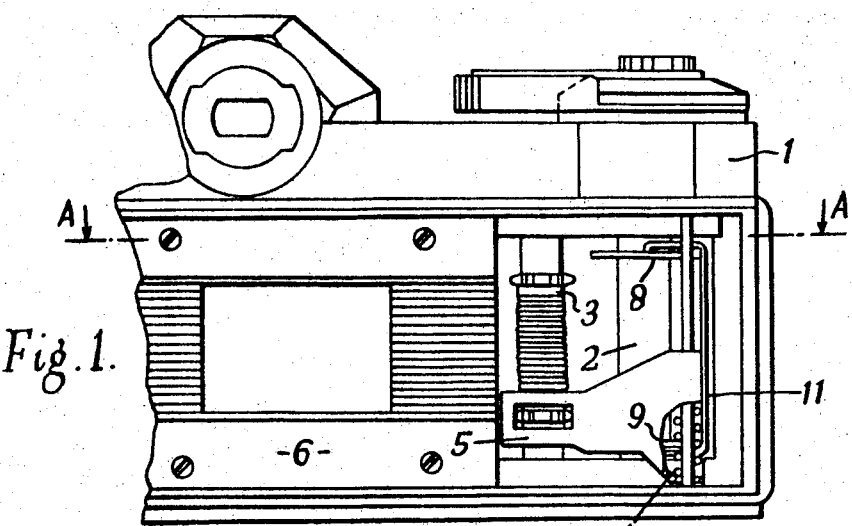
FIGURE 1 shows the broken-away rear view of a photographic camera with the threading arrangement according to the invention, in which the take-up spool core rotates oppositely to the film feed roller.
Figure 2:
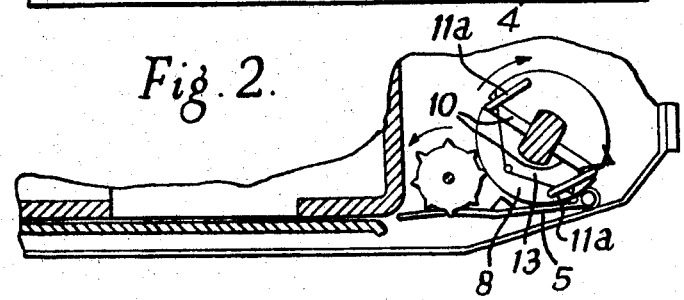
FIGURE 2 shows a section along the line A—A in FIGURE 1.
Figures 3, 4, 5:
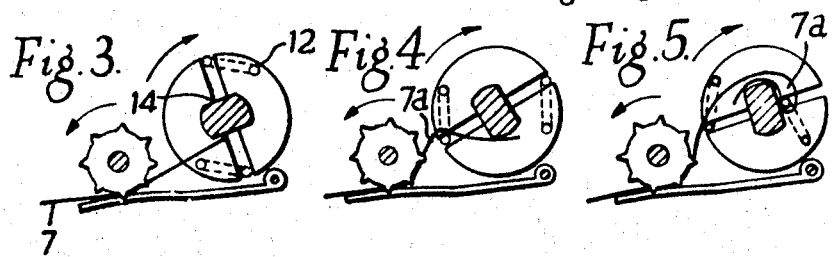
FIGURES 3 to 5 show the position of the individual parts of the device in various phases of the threading operation.

A take-up spool core 2 is mounted in a camera body 1 and connected for drive, through a friction coupling known per se, in a manner not illustrated, with the film feed roller 3, the take-up spool core 2 rotating in the opposite direction to the film feed roller 3. The film 7 coming from the exposure gate 6 is pressed against the film feed roller 3 by a presser element 5 pivotably mounted on the camera body 1 and influenced by a spring 4. The spool flanges 8, 9 secured on the take-up core 2, have slots 10 extending radially of the take-up spool core 2. In these slots there are guided two U-shaped engaging stirrups 11, the legs 11a of which are pivotally mounted about the pivot points 12 on the outer faces of the spool flanges 8, 9. Torsion springs 13 engaging on the legs 11a of the engaging stirrups 11 press the engaging stirrups 11 outwards, that is to say away from the take-up spool core 2. In order to carry out the threading operation, after the presser element 5 is hinged away, the film lead coming from the film supply spool (not shown) is drawn over the exposure gate 6 to the level of the take-up spool core 2, and attached by means of its perforation to the teeth of the film feed roller 3. Thereupon the presser element 5 is hinged in, so that the engagement of the teeth with the film perforation is maintained. As a result of the twist inherent in the film from the supply side, the film lead lies against the take-up spool core 2 (FIGURE 3). On operation of the film feed handle (not shown) the engaging stirrup 11 following in each case in the direction of rotation of the take-up spool core 2 strikes against the film 7, the commencement of which then bears upon the take-up spool core 2. Thus a film loop 7a commences to form (FIGURE 4), which is tightened in the further course of rotation of the take-up spool core, in that the engaging stirrup 11 moves in the slots 10 along a short arcuate path in the direction of the take-up spool core 2 (FIGURE 5) due to the action of the film traction, so that finally the engaging stirrup 11 rests on a flattened portion 14 provided on the take-up spool core, clamping the film fast.

Figure 6:
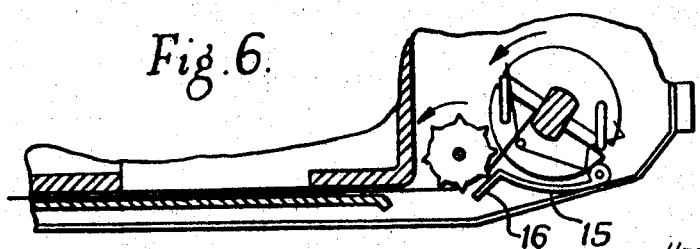
FIGURE 6 shows a section along the line A—A [FIGURE 1], illustrating a camera in which the take-up spool core rotates in the same direction as the film feed roller.

In the example of embodiment according to FIGURE 6 the take-up spool core 2 is driven in the same direction as the film feed roller 3. The pivot points of the engaging stirrups 11 in this case lie on the other side of the slots 10 and a guide face 16 provided on a spring-loaded presser element 15 presses the film 7 against the film feed roller 3 and guides the film lead on to the side of the take-up spool core 2 lying opposite to the film feed roller 3.

We claim:

1. In a photographic camera having a housing in which is rotatably mounted a film take-up spool, having a core and two spool flanges, a film transport sprocket, a film winding mechanism and gearing means connected between said winding mechanism and said sprocket and take-up spool to effect simultaneous rotating of said sprocket and spool, the provision of:
  (a) a slot in each of said spool flanges, said slots being in alignment axially of the core;
  (b) a U-shaped stirrup having side arms and a connecting piece pivotably mounted by said arms on the two spool flanges laterally of the slots in the direction of the rotation of the spool, said connecting piece being movable along said slots, and
  (c) a film guide element pivotally mounted in said housing and extending in close proximity to the take-up spool and to the sprocket;

whereby, as the film is transported by the sprocket the film end is guided by said element between the spool flanges and bearing upon the take-up spool core the film end forms a loop around the connecting piece of the stirrup which moves under the action of the film traction towards the take-up spool core and in doing so pushes the film end against the take-up spool core.

2. A photographic camera according to claim 1, wherein the take-up spool is provided with a further stirrup pivotably mounted thereon having side arms and a connecting piece, the latter being movable in further radially extending slots in the spool flanges provided diametrically opposite the first pair of slots.

3. A photographic camera according to claim 1, wherein the take-up spool core is provided with a flat co-incident with the bottom of the slots in the axial direction.

4. A photographic camera according to claim 1, wherein the take-up spool core is provided with a cut away portion co-incident with the bottom of the slots in the axial direction.

References Cited

UNITED STATES PATENTS

| | | | |
|---|---|---|---|
| 1,871,234 | 8/1932 | Proctor | 242—74 |
| 1,920,657 | 8/1933 | Morsback | 242—74 |
| 2,336,278 | 12/1943 | Mihalyi | 95—31 |
| 3,090,574 | 5/1963 | Doncaster et al. | 242—55.13 |

NORTON ANSHER, Primary Examiner

J. F. PETERS, JR., Assistant Examiner

U.S. Cl. X.R.

242—55.11, 74